US009135900B2

(12) United States Patent　　(10) Patent No.: US 9,135,900 B2
Carpenter　　(45) Date of Patent: Sep. 15, 2015

(54) HOLDER FOR MUSICAL INSTRUMENTS AND/OR ACCESSORIES

(71) Applicant: Daniel Lance Carpenter, Anaheim, CA (US)

(72) Inventor: Daniel Lance Carpenter, Anaheim, CA (US)

( * ) Notice: Subject to any disclaimer, the term of this patent is extended or adjusted under 35 U.S.C. 154(b) by 131 days.

(21) Appl. No.: 13/887,775

(22) Filed: May 6, 2013

(65) Prior Publication Data

US 2014/0014796 A1　　Jan. 16, 2014

Related U.S. Application Data

(60) Provisional application No. 61/671,294, filed on Jul. 13, 2012.

(51) Int. Cl.
*B60N 3/10*　　(2006.01)
*G10G 5/00*　　(2006.01)
*G10D 13/00*　　(2006.01)

(52) U.S. Cl.
CPC .................. *G10G 5/00* (2013.01); *G10D 13/00* (2013.01); *B60N 3/104* (2013.01)

(58) Field of Classification Search
USPC ............ 211/106, 106.01, 107, 112, 119, 196, 211/205, 181.1; 248/690, 692, 219.4, 248/218.4, 303, 304, 305, 311.2, 312, 1
See application file for complete search history.

(56) References Cited

U.S. PATENT DOCUMENTS

| 1,559,783 | A | * | 11/1925 | Rose et al. | 211/107 |
| 2,559,739 | A | * | 7/1951 | Sherman | 211/70 |
| 2,562,443 | A | * | 7/1951 | Barbour et al. | 248/311.2 |
| 2,607,554 | A | * | 8/1952 | Charipar | 248/312 |
| 6,375,141 | B1 | * | 4/2002 | Kettlestrings | 248/303 |
| D573,011 | S | * | 7/2008 | Decker et al. | D8/380 |
| 7,922,131 | B2 | * | 4/2011 | Hamilton | 248/121 |
| 2007/0090251 | A1 | * | 4/2007 | Padden | 248/303 |
| 2009/0139944 | A1 | * | 6/2009 | Drew et al. | 211/107 |
| 2013/0037672 | A1 | * | 2/2013 | Sanchez | 248/303 |

\* cited by examiner

*Primary Examiner* — Alfred J Wujciak

(57) ABSTRACT

The invention provides for a simple and inexpensive holder for musical instruments. Unlike existing instrument holders, the present invention mounts without any tools or clamps onto the shaft of a stand such as a microphone stand, music stand, or similar stand and and is easily installed or repositioned or removed. The object of this invention is to hold various musical instruments or a plurality of various instruments and/or accessories when not in use in a convenient place during a performance or rehearsal and display for easy selection of use when desired. It utilizes a stand that is most likely to be already in use therefore eliminating the need for another stand while providing the convenience of the holder.

1 Claim, 2 Drawing Sheets perspective view

Fig. 1 perspective view
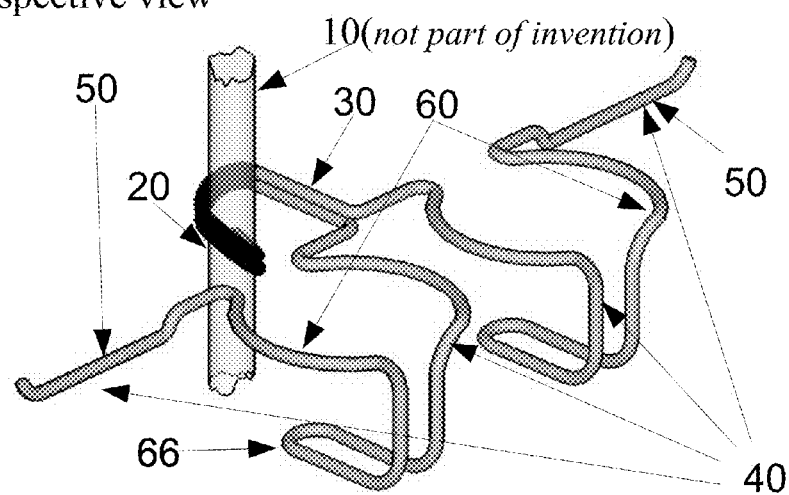
Fig. 2 sideview
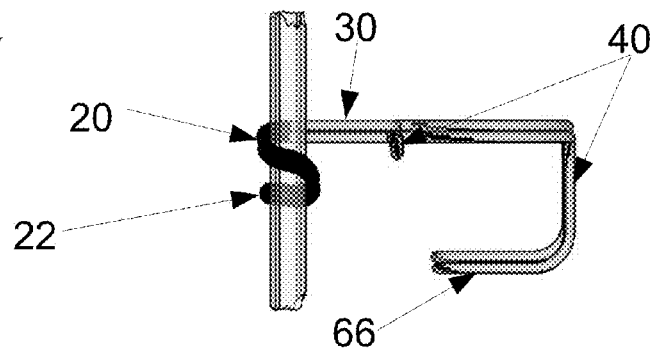
Fig. 3 frontview
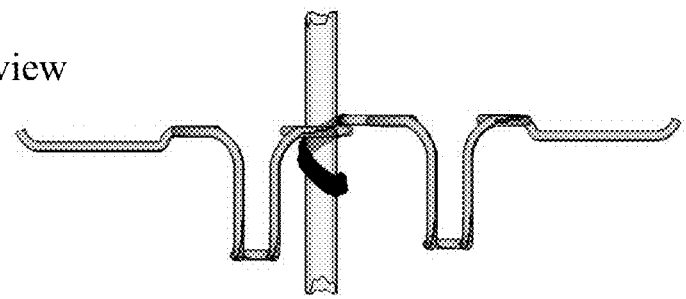

Fig. 4 top view
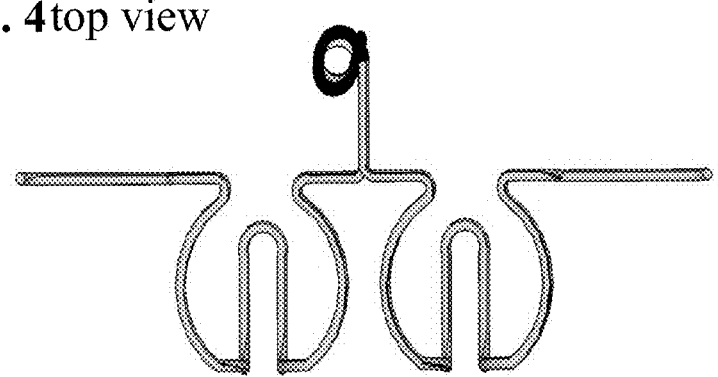
Fig. 5 perspective with examples of instruments
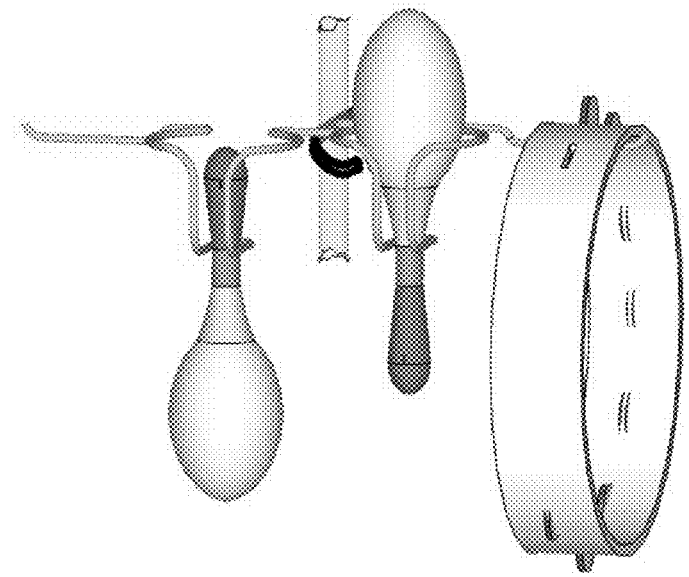

HOLDER FOR MUSICAL INSTRUMENTS AND/OR ACCESSORIES

CROSS-REFERENCE TO RELATED APPLICATIONS

This application claims priority from U.S. Provisional Application No. 61/671,294 filed Jul. 13, 2012.

The following patents are considered to be of general relevance to the subject matter of the present invention.

U.S. Pat. No. 1,345,252 entitled Sputum-Cup Holder issued to Rubin

U.S. Pat. No. d487,862 entitled Cup Holder issued to Tincher; Sid

U.S. Pat. No. 7,300,027 entitled Musical Instrument Hanger issued to Walker

U.S. Pat. No. 1,734,577 entitled instrument support for music stands issued to William Henry

STATEMENT REGARDING FEDERALLY SPONSORED RESEARCH OR DEVELOPMENT (Not Applicable)

REFERENCE TO SEQUENCE LISTING, A TABLE, OR A COMPUTER PROGRAM LISTING COMPACT DISC APPENDIX (Not Applicable)

BACKGROUND OF THE INVENTION

The present invention pertains to field of holders USPTO class 211 supports: racks, and more specifically for musical instruments and accessories while not in use. Musicians often play more than one instrument and/or sing and often during the same musical composition. During a musical performance or rehearsal, there is often a need to be able to change quickly and smoothly from one instrument to another or to have instruments readily available for quick selection and use, or to set aside for quick selection and use at a later time. This is especially true for vocalists, musicians that play wind instruments, and percussionists. The invention provides for a simple, inexpensive, durable, light-weight, portable holder for a variety of hand-held instruments and/or accessories that easily hooks onto a microphone stand, music stand, cymbal stand, or other similar stands that may already be in use, and displays them for convenient selection and access. Moreover, a concert stage or other performance or rehearsal space may become crowded by instruments, instrument stands, sheet music stands, microphone stands, as well as other equipment such as amplifiers, cables, speakers, lighting equipment, etc. There is usually a need for space-saving measures in an entertainment stage environment and it is desirable to carry the least amount and lightest equipment possible when traveling to and from shows. This holder requires no extra floor space and is easily packed without adding any significant weight to the equipment load and may eliminate the need for at least one stand.

U.S. Pat No. 1,345,252 entitled Sputum-Cup Holder issued to A. Z. Rubin utilizes a configuration similar to the cradle-like instrument securement portion in this invention for a cup holder that accommodates the handle while securing the cup using a single piece of wire bent to a configuration that provides a bottom support and sides that bracket the cup and a portion that will insert into the mounting.

U.S. Pat. No. d487,862 entitled Cup Holder issued to Sid Tincher utilizes a configuration similar to the mounting portion of this invention. Tincher utilizes a spiral-loop coated with a rubberized substance designed to use friction and gravity to support a beverage holder.

U.S. Pat No. 7,300,027 entitled Musical Instrument Hanger issued to Walker utilizes a configuration similar to the hook-like prongs in the instrument securement portion of this invention. Walker also utilizes a microphone stand but requires an open end on the shaft and thus preventing the stand from being used a microphone stand in conjunction. Moreover, it is not usable with other stands such as cymbal stands or music stands.

U.S. Pat No. 1,734,577 entitled instrument suppport for music stands issued to William Henry utilizes a spring clip shaped configuration to clamp a specific type of handheld instrument like a clarinet, straight saxophone, or violin. The Henry holder is mounted to a stand by using a clamp which is awkward and a bit cumbersome to install and requires several parts to be manufactured and assembled, any one of which could be lost in the stage setup environment rendering it useless.

BRIEF SUMMARY OF THE INVENTION

It is an object of the present invention to provide a simple, inexpensive, lightweight, and durable instrument holder for supporting and/or hanging and displaying musical instruments or accessories thereon, typically when the instrument is not in use and to hold in a convenient place for quick and easy retrieval. Such holder suitable for use with an existing or conventional stand most likely to already be in use by the musician, thereby saving space.

In accordance with one aspect of the present invention, there is provided an instrument holder for mounting on a stand having a base and a shaft, the holder comprising:

A mounting portion sized to wrap around the shaft therein, and affix the holder to the shaft. This portion attaches to the shaft of the stand without requiring an open end on the shaft. It requires no tools or clamping, making installation, repositioning, and removal faster and easier than existing holders.

An instrument securement portion connected to the mounting portion and shaped to receive a part of an instrument and to prevent the instrument from becoming detached inadvertently from said securement portion under a moderate force acting on the instrument in a horizontal or downward direction. In an embodiment of the invention, the holder may comprise a neck portion interconnecting the mounting portion and the instrument securement portion.

In an embodiment of the invention, the stand referred to that is used for mounting the holder is a conventional microphone stand, music stand, cymbal stand, or other such similar stand.

In an embodiment of the invention, the mounting portion, the securement portion and the neck portion may comprise a continuous length of the same bar or wire forming at least a part of the mounting portion and the instrument securement portion.

The term "moderate force" denotes a reasonable force that may be encountered in a regular use of the instrument hanger, such as an inadvertent push or knock against the stand with the instrument resting on the hanger, a gust of wind, a vibration or a similar occurrence, but not a strenuous force or effort sufficient to distort the hanger.

BRIEF DESCRIPTION OF THE SEVERAL VIEWS OF THE DRAWING

Embodiments of the invention will be described below with reference to the accompanying drawings in which like reference numerals correspond to like elements and in which:

FIG. 1 is a perspective view of an instrument holder of an embodiment of the present invention as it is mounted on a stand's shaft;

FIG. 2 is a sideview of the holder of FIG. 1 as it is mounted on a stand's shaft;

FIG. 3 is a frontview of the holder of FIG. 1 as it is mounted on a stand's shaft;

FIG. 4 is a topview of the holder of FIG. 1;

FIG. 5 is a perspective view of the holder of FIG. 1 of the present invention with instruments placed thereon as it is mounted on a stand's shaft;

DETAILED DESCRIPTION OF THE INVENTION

An exemplary musical instrument holder is shown in FIG. 1 as it is mounted on a stand's shaft 10. The holder comprising a mounting portion 20, a neck portion 30 and an instrument securement portion 40 and is made of a single length of a rigid wire, for example a 3/16 inch diameter metal wire, bent or molded or otherwise shaped to the determined configuration. The wire should be rigid enough, considering the dimensions of the holder, to support a specific instrument without significant distortion. Other materials, like a sufficiently rigid polymeric material, e.g. polypropylene, may alternatively be used.

The mounting portion 20 is sized to fit snugly around the shaft 10 with a circumference that may complete but does not significantly exceed 360 degrees and spirals downward at an incline steep enough to make the distance between the top and bottom of the spiral sufficient to accommodate the diameter of the shaft allowing the installation of the holder at any point along the shaft thus requiring no open end on said shaft. The holder may be made of a round wire as shown herein, or of a bar having a non-circular cross-section which may be the case for an extruded or formed plastic (polymer) bar. The holder of FIG. 1 shows a mounting portion made by folding the wire and creating the spiraled loop with the doubled up wire, the folded edge FIG. 2/22 at the bottom end of the spiral. This configuration allows for the two ends of the same wire to be free for configuring for the instrument securement portion and allows for support or each, thereby doubling the capacity. This eliminates the need for welding or otherwise bonding two pieces together for that purpose. A holder designed to hold a single item may have the mounting portion configured at one end of the wire and the instrument securement portion at the other end. The mounting portion should be coated with a rubberized material or textured or otherwise modified to increase friction.

The instrument securement portion 40 in the embodiment of the invention in FIG. 1 comprises two cradle-like configurations 60 and two hook-like prong configurations 50. In the embodiment illustrated here, the end portions of the prongs 50 have upward bent portions (not necessarily vertically) that are bent to a degree sufficient to prevent the inadvertent displacement of an instrument there from as a result, e.g., a vibration, tremor, accidental knock of the stand or the instrument, etc. The cradle-like configurations comprise upper edges that bracket a determined circumference and a bottom support 66. In the embodiment of the invention of FIG. 1 the cradle's bottom support 66 is a loop of wire that extends downward from the front of the bracketing edges for a certain distance and then back under them. This configuration creates an opening at the front of the cradle which can allow a handle of an instrument to slip through and hang down. The hook-like and cradle-like securement means 40 should enable the release of the instrument by an upward force.

The present invention, by comparison to certain conventional instrument support devices, has reduced size and weight and improved portability, convenience, durability and may reduce travel expenses.

The foregoing are exemplary embodiments of the present invention and a person skilled in the art would appreciate that modifications to these embodiments may be made without departing from the scope of the invention. For example, the invention may be useful for holding other objects than musical instruments, such objects defined herein as "instruments".

The invention claimed is:

1. An instrument holder suitable for mounting on a stand having a shaft, said holder constructed as a one-piece unit from bending a single, continuous length of metal wire having a circular cross-section sufficiently rigid to support the instruments for which it is designed without significant distortion and comprising:

a mounting portion that utilizes a coil shape that spirals downward for approximately 360 degrees at a circumference that will accommodate the shaft of the stand for which it is designed to be mounted; and an instrument securement portion having two cradle-like configurations wherein each cradle-like configuration comprising two upper edges, two front edges connected to each upper edge and extending downward from the two upper edges, and a bottom support extending from the two front edges and below the upper edges, wherein the two front edges and bottom support form in a loop shaped configuration, said loop having a width sufficient to allow the narrow portion of an instrument's tapered handle to pass through but narrow enough to prevent the wider portion of said tapered handle to pass through thereby allowing said loop to also function as a hanger, and each said cradle-like configuration having one prong extending laterally from one of the upper edges and the prong comprises an upwardly facing tip; and a neck portion connecting the mounting portion and the instrument securement portion providing spacing therebetween.

* * * * *